United States Patent [19]

Miller

[11] 3,984,507
[45] Oct. 5, 1976

[54] USE OF ACRYLAMIDE POLYMERS AS A STOPLEAK IN CLOSED COOLING SYSTEMS

[75] Inventor: Robert A. Miller, Chicago, Ill.

[73] Assignee: Nalco Chemical Company, Oak Brook, Ill.

[22] Filed: Nov. 25, 1974

[21] Appl. No.: 526,870

[52] U.S. Cl. .................................... 264/36; 252/72; 260/29.6 WQ; 260/29.6 H; 260/29.6 HN; 264/35
[51] Int. Cl.² ...................... C09K 3/12; F01P 3/22
[58] Field of Search ............. 260/29.6 WQ; 252/72; 264/32, 35, 36

[56] References Cited
UNITED STATES PATENTS

| | | | |
|---|---|---|---|
| 3,282,874 | 11/1966 | Friedrich et al. | 260/29.2 UA |
| 3,504,746 | 4/1970 | Freifeld et al. | 252/72 |
| 3,630,914 | 12/1971 | Nankee et al. | 252/72 |
| 3,734,873 | 5/1973 | Anderson et al. | 260/29.6 H |

*Primary Examiner*—Eugene C. Rzucidlo
*Attorney, Agent, or Firm*—John G. Premo; Robert A. Miller; Barry W. Sufrin

[57] ABSTRACT

A method for stopping leaks in closed cooling systems by adding thereto a finely divided acrylamide polymer.

4 Claims, No Drawings

USE OF ACRYLAMIDE POLYMERS AS A STOPLEAK IN CLOSED COOLING SYSTEMS

Leaks in closed cooling systems employing aqueous coolants can cause serious problems in homes, factories and in both gasoline and diesel engines powering vehicles used for transportation purposes. Much work has gone into perfecting compounds which would provide safe temporary repairs for systems which develop leaks and which would still render the cooling system usable for a reasonable length of time until the cooling system can be shut down for permanent repairs.

One typical method of preparing a "stopleak" has been to disperse fine particles of asbestos into the aqueous coolant and circulate this through the cooling system until they plug small pinhole leaks. While this treatment has enjoyed success, asbestos has been recently classified as a toxic substance and it would be desirable to eliminate this material from cooling systems.

I have found that by the addition of a water-soluble vinyl addition polymer to a closed cooling system small leaks can be temporarily sealed while not impeding the flow of water, or taking the chance that small particulate matter will plug narrow passage ways within the cooling system.

It is, therefore, an object of my invention to provide to the art a method for stopping leaks in closed cooling systems.

A further object of my invention is to provide to the art a method for stopping leaks in closed cooling systems by the addition thereto of a water-soluble polymer or copolymer of an ethylenically unsaturated vinyl addition monomer.

A still further object of my invention is to provide to the art a method for stopping leaks in closed cooling systems by the addition thereto of a water-soluble polymer or copolymer of acrylamide at a concentration sufficient to cause some change in the viscosity of the aqueous coolant but while not increasing the viscosity above 50 centipoises at the temperature at which the system is running.

THE INVENTION

In the use of the polymers which are the subject of my invention in closed circulating cooling systems, I prefer to add from 0.001–0.1% by weight polymer based on the quantity of aqueous coolant contained within the coolant system. Ideally the amount of polymer added should be in the amount sufficient to cause a slight viscosity change in the coolant, yet not be of sufficient quantity so as to obtain an extremely viscous coolant which will not transfer heat as efficiently as a more flowable coolant. The polymers of my invention may be admixed with coolants consisting of water and water and anti-freezes such as ethylene glycol and alcoholic anti-freezes such as methanol. When the polymer is used in combination with the anti-freeze solution its compatibility should be checked in order to make sure that it will not precipitate out of the coolant. This is especially true when using the polymers of my invention with alcoholic type anti-freeze materials. The polymers which are the subject of my invention are also stable to normal radiator additives such as cleaners, lubricants, and corrosion inhibitors.

After the polymer has been added to the aqueous coolant, the water is allowed to circulate by normal means throughout the cooling system. I have found that the polymer tends to migrate to the damaged area and thus seal the leak.

It must be understood that my treatment is not meant to be a permanent repair just as the addition of asbestos was not means to be a permanent repair and the damaged area should be repaired properly by such techniques as welding and soldering within a reasonable length of time after the leak is discovered. However, with the use of the polymers of my invention one can make temporary repairs when sophisticated welding or soldering devices are not readily available.

The polymers of my invention may be used in systems which include hot water heating systems in homes, automotive and diesel engine radiators, cooling systems employed in stationary engines such as those used for emergency electrical power, and other applications where cooling is achieved by passing an aqueous coolant through a suitable heat transfer unit.

As a further benefit I have found that the aqueous polymers of my invention act as lubricants to the pump which forces the water through the cooling system. While this is also a temporary benefit due to the fact that the shear exerted by the pump will eventually break down the polymers of my invention, a noticeable increase in lubricity of the water which passes through the pump is noted.

THE ACRYLAMIDE POLYMERS

These polymers are well known to the art and have been described in numerous publications and patents. The polymers used in this invention are acrylamide polymers which include polyacrylamide and its water-soluble copolymeric derivatives such as, for instance, acrylamide-acrylic acid, and acrylamide-acrylic acid salt copolymers which contain from about 95 – 5% by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5% by weight of acrylamide.

The molecular weight of the polymers I wish to employ in my invention should exceed 500,000 and preferably should exceed 1,000,000. This is due to the fact that less polymer will be required to obtain the viscosity differential necessary in order to plug small pinhole leaks in the cooling systems which are the subject of my invention.

The polymers used in my invention may be in any conventional form, either as a solid, solution or latex. However, in the preferred embodiment of my invention I prefer to use stable water-in-oil emulsions of the above mentioned polymers. These water-in-oil emulsions are described in great detail in U.S. Pat. No. 3,624,019. Another further feature of the water-in-oil emulsion of a finely divided polymer which I prefer to use is that they will invert when added to a circulating closed cooling system. This inversion technique is described in U.S. Pat. No. 3,624,019 which is herein incorporated by reference.

In order to better illustrate my invention the example is presented:

EXAMPLE

A standard automotive V-8 engine with a 16 quart cooling system capacity and operating with a permanent type anti-freeze solution consisting of 50% ethylene glycol and 50% water experienced pinhole leaks in the automotive radiator causing loss of anti-freeze solution. To the radiator would be added 29 grams of a water-in-oil emulsion of a finely divided copolymer of acrylamide (75%) and sodium acrylate (25%) having a molecular weight greater than 1 million and a polymer concentration of 25% so as to have a polymer concentration within the water of 0.05%. After a short period of time in normal operation, the leaks in the automotive radiator would stop due to the polymer within the water. It is noted that the amount of polymer added would not be sufficient to significantly raise the viscosity of the aqueous coolant.

I claim:

1. A process for stopping leaks in closed recirculating systems which comprises adding to the aqueous coolant solution from 0.001 – 0.1% by weight of a water-soluble acrylamide polymer having a molecular weight in excess of 500,000.

2. The process of claim 1 wherein the aqueous coolant system contains an anti-freeze compound mixed with water.

3. The process of claim 1 wherein the acrylamide polymer is added to the cooling system in the form of an invertible water-in-oil emulsion.

4. The process of claim 1 wherein the closed coolant system is part of a gasoline or diesel engine.

* * * * *